United States Patent Office 3,453,540
Patented July 1, 1969

3,453,540
CIRCUIT THAT ANALYZES TRANSIENT SIGNALS
IN BOTH THE TIME AND FREQUENCY DOMAINS
George J. Dusheck, Jr., Cinnaminson, N.J., assignor to
Radio Corporation of America, a corporation of
Delaware
Filed Dec. 23, 1965, Ser. No. 516,001
Int. Cl. G01r 23/16, 27/02
U.S. Cl. 324—77                          8 Claims

ABSTRACT OF THE DISCLOSURE

A transient signal analyzer circuit extracts known, but random, signals from background noise by making a frequency domain and a time domain analysis of the transient signal. The frequency analysis comprises the dividing of each input signal into a plurality of component signals of preselected frequencies whereas the time analysis comprises the extracting of the instantaneous maximum amplitudes of the component signals and combining them into a composite signal that is an envelope of the maximum amplitudes of the component signals. The successive peaks that occur in the composite signal are then detected and the component signal that effectively produces each peak is indicated. Such analyses differentiate the known signal from background noise.

Background of the invention

In various types of signal recognition systems, it is frequently desirable to be able to extract known and meaningful transient signals from noise signals even though both types of signals may be similar.

Accordingly, it is an object of this invention to provide an analyzer circuit that extracts known but aperiodic transient signals from signal-like background noise.

Another object of this invention is to provide a plural peak detector that separately detects each peak in a signal having a plurality of peaks.

A transient analyzer circuit embodying the invention performs analyses in both the frequency and time domains on each input signal to extract desired transient signals from noise signals. The analyzer circuit separates each input transient signal into a plurality of component signals of preselected frequencies to provide a frequency analysis of each input signal. Each component signal extracted from the input transient signal builds up and decays at rates that differ from the other component signals. The maximum instantaneous amplitudes of the component signals are combined to form a composite maximum energy signal having a plurality of peaks. Each of the peaks in the composite signal is detected to provide a time-energy analysis of the composite signal and hence of the input transient signal. The difference in the time of occurrence of the peaks in a desired transient signal and in a noise signal, as well as the different frequencies at which the peaks occur in each type of signal, form the basis for separating the desired transient signal from the background noise signals.

A feature of the invention is the provision of a plural peak detector to separately detect each peak in a composite input signal. The plural peak detector produces an output trigger signal whenever a negative slope in an input signal is detected after a positive slope; thereby denoting a peak in the input signal. The plural peak detector includes means for detecting positive and negative slopes in an input signal to produce positive and negative slope signals, respectively. A storage device is utilized to store each positive slope signal. A coincidence circuit is provided to produce an output trigger signal whenever a negative slope signal is produced coincident in time with the storage of a positive slope signal in the storage device. The storage device has a specified decay time requiring the detection of a negative slope some small time period after the detection of the positive slope. Means are coupled to read the positive slope signal from the storage device whenever an output trigger signal is produced so as to prepare the storage device for the next positive slope and the plural peak detector for the next peak in the input signal.

Figure 1:
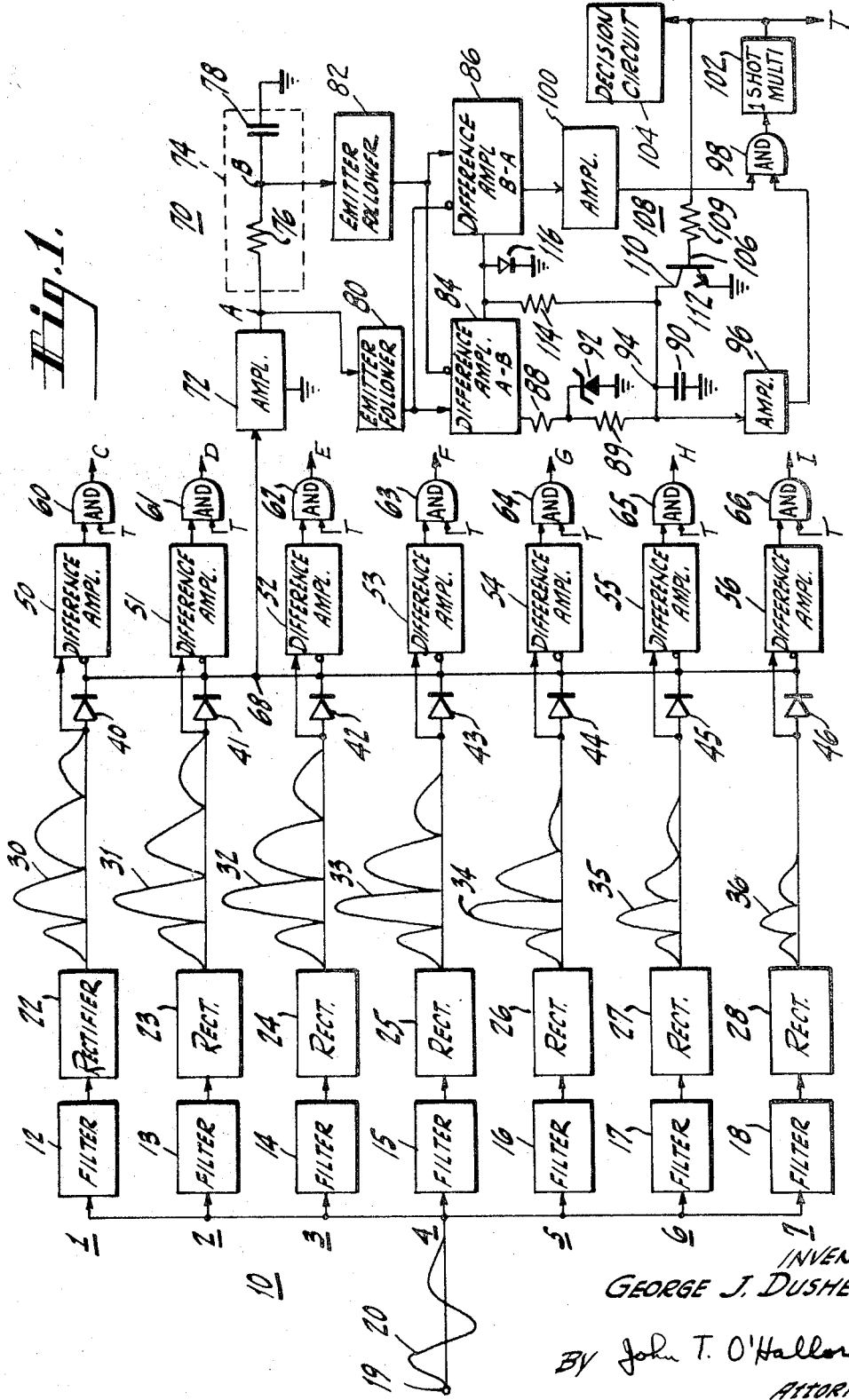
Figure 2:
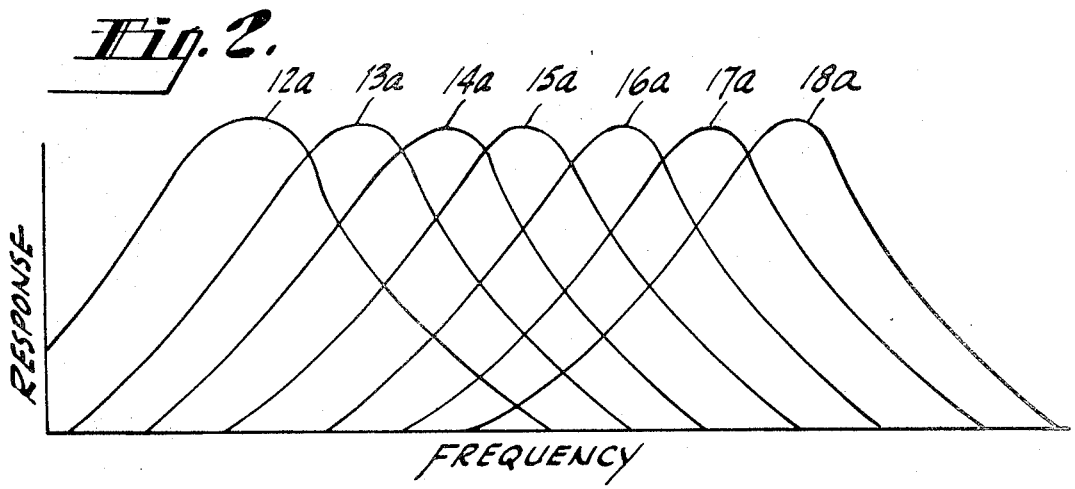
Figure 3A:
Figure 3B:
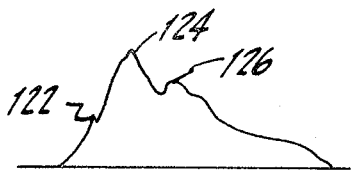
Figure 3C:
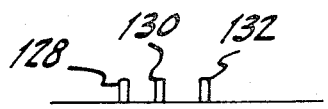

In the drawing:
FIGURE 1 is a schematic block diagram of a transient signal analyzer circuit embodying the invention;
FIGURE 2 is a graph illustrating the frequency characteristics of a plurality of filters utilized in the transient signal analyzer circuit of FIGURE 1; and
FIGURES 3a, 3b and 3c are curves helpful in understanding the operation of the transient signal analyzer circuit of FIGURE 1.

Referring to FIGURE 1, a transient signal analyzer circuit 10 includes a plurality of frequency channels 1 through 7 each including one of a plurality of bandpass filters 12–18 all coupled to an input terminal 19 of the circuit 10. It is to be noted that although seven channels are illusrated any desired number can be utilized based on the input signals to be recognized. A desired transient signal 20, which may be of the type illustrated in FIGURE 1, is applied to the input terminal 19. Noise signals may, for example, precede and succeed the transient signal 20. A full-wave rectifier 22 is coupled to the filter 12 in channel 1 of the analyzer circuit 10. Similarly, a separate one of the full-wave rectifiers 23–28 is coupled to the filters 13–18 in the channels 2–7, respectively. The filters 12–18 provide a frequency spectrum analysis of the input signal 20 and separate the input signal into a plurality of signals of preselected frequencies which are rectified by the full-wave rectifiers 22–28 to produce unipolar component signals 30–36. The component signals 30–36, which are produced in the channels 1–7, respectively, are made unipolar in form to provide ease in the further processing of these signals. Each of the component signals 30–36 exhibits different buildup and decay times as well as different peak values depending upon the different frequency content of the input transient signal 20.

The bandpass filters 12–18 may, for example, comprise a series of RLC circuits, each of which is designed to exhibit a low Q. Such a low Q bandpass filter does not store much energy and hence little impulse type ringing occurs when a transient wave such as the input signal 20 is applied thereto. Therefore, the shapes of the component signals 30–36 are determined to a greater degree by the input signal 20 than by the filters 12–18. The low Q filters 12–18 may, for example, exhibit bandpass characteristics such as those illustrated in FIGURE 2. Each of the curves labeled 12a–18a corresponds to the frequency response of each of the bandpass filters 12–18, respectively. It is to be noted that the response curves 12a–18a overlap each other.

The rectifier 22 in channel 1 is coupled through a diode 40 to a first input of a difference amplifier 50 by coupling the output terminal of the rectifier 22 to the anode of the diode 40 and the cathode of the diode 40 to the first terminal of the amplifier 50. Additionally, the rectifier 22 is also coupled directly to a second input terminal of the difference amplifier 50. As described more fully hereinafter the difference amplifier 50 is of the neuron type and the first and second inputs correspond to the inhibit and excite inputs, respectively. A neuron circuit that may be utilized is described in a copending application for Thomas B. Martin and Ellwood P. McGrogan, Jr., entitled "Threshold Circuit," Ser. No. 406,681, filed Oct. 27, 1964, and assigned to the same assignee as the present invention. Similarly, the rectifiers 23–28 in channels 2–7 are also coupled through diodes 41–46, respectively, to the respective inhibit input terminals of the difference amplifiers 51–56. The rectifiers 23–28 are also coupled directly to the excite input terminals of these difference amplifiers. In FIGURE 1, an inhibit terminal is designated by a small circle whereas an excite terminal is designated by an arrowhead. A difference amplifier such as the amplifier 50 produces an output only when a signal applied to the excite terminal thereof exceeds the signal applied to the inhibit terminal. The amplifier output is equal to the net difference between the excite and the inhibit signals. The difference amplifier 50 is coupled to a first input terminal of a two-input AND gate 60 and the second input to this gate comprises a trigger signal (T), the origin of which will be described subsequently. Similarly, the difference amplifiers 51–56 are coupled, respectively, to one input terminal of the AND gates 61–66 whereas the other input signal to these gates is a trigger signal T.

The channels 1–7 are also coupled to a plural peak detector 70 by connecting the cathodes of all the diodes 40–46 to a junction point 68 and connecting the junction point 68 to the detector 70. The plural peak detector 70 includes an amplifier 72 coupled to the junction 68 to amplify a composite signal that is formed at the junction 68. A slope detector, such as a differentiator 74, is coupled between the amplifier 72 and a point of reference potential or ground. The differentiator 74 comprises the serial combination of a resistor 76 and a capacitor 78 which are selected to exhibit a short R-C time constant so as to rapidly sense changes in the output of the amplifier 72. One terminal A of the resistor 76 is coupled to an isolating circuit such as an emitter follower 80, whereas the other terminal B of the resistor 76 is coupled to a second isolating circuit such as emitter follower 82. The output of the emitter follower 80 is coupled to the excite terminal of a first difference amplifier 84 as well as to the inhibit terminal of a second difference amplifier 86. Similarly, the second emitter follower circuit 82 is coupled to the inhibit terminal of the first difference amplifier 84 as well as to the excite terminal of the second difference amplifier 86. The output of the first difference amplifier is coupled through resistors 88 and 89 to a storage device which may, for example, comprise a capacitor 90. The junction of the resistors 88 and 89 is coupled through a Zener diode 92 to ground, and the capacitor 90 is also coupled to ground. The ungrounded electrode or junction 94 of the capacitor 90 is coupled through an amplifier 96 to one terminal of a two-input coincidence circuit such as AND gate 98. Similarly, the output of the second difference amplifier 86 is coupled through an amplifier 100 to the second input terminal of the AND gate 98. The output of the AND gate 98 is coupled to a one-shot multivibrator 102 which produces an output trigger signal T when activated by the gate 98. The otput trigger signal T is applied to a decision circuit 104 along with the outputs of the gates 60–66 in the channels 1–7. These outputs are labeled C through I, respectively. The trigger signal T is also coupled through base resistor 109 to the base 106 of a transistor switch 108. The transistor switch 108 comprises, for example, an NPN transistor having a collector 110 and an emitter 112 and coupled across the capacitor 90 from the junction point 94 to circuit ground. The junction point 94 of the capacitor 90 is also coupled through a resistor 114 to a second excite terminal of the second difference amplifier 86 to apply a bias signal to this amplifier. A diode 116 is coupled from the resistor 114 to circuit ground to limit the bias signal applied to the second difference amplifier 86.

In operation, an input signal applied to the transient analyzer circuit 10 may be either a desired transient signal or noise. It is assumed that the signal 20 illustrated in FIGURE 1 is a desired transient signal. Such signals may occur randomly, i.e. aperiodically, and may be preceded and succeeded by noise signals. The transient signals 20 are substantially identical to each other even though they occur randomly. The various frequency components that make up such a transient signal 20 produce a response in each separate one of the filters 12–18 in the frequency channels 1–7. The filters 12–18 therefore effectively perform a frequency analysis on the input signal 20 to produce the variety of component signals 30–36. The component signals 30–36 are rectified by the rectifiers 22–28 so as to provide unipolar signals to permit the unidirectional difference amplifiers 50–56 to be utilized.

The component signals 30–36 are combined in the analyzer circuit 10 to form a composite signal so that a time-energy analysis can be made. The component signal with the largest instantaneous amplitude forward biases the diode associated with it. For example, assume that the first peak, the left-hand peak, in the component signal 33 is the highest amplitude signal at the instant in time it occurs. Such a maximum amplitude signal forward biases the diode 43 and clamps the junction point 68 to substantially this level. Consequently, all of the remaining ones of the diodes 50–56 are reverse biased and nonconductive. The component signal 33 also causes the difference amplifier 53 to conduct. This is because the component signal itself is applied to the excite terminal of the amplifier 53 whereas the component signal 33 minus the voltage drop in the diode 43 is the inhibit signal for the the amplifier 53. The difference between the two signals is enough to turn on the amplifier 53. The conduction of the amplifier 53 enables the AND gate 63 to produce an output signal F if a trigger signal is produced by this peak of the component signal 33 in the plural peak detector 70.

The junction point 68 effectively combines all of the component signals 30–36 to produce a resultant composite signal that is the maximum of the instantaneous amplitudes of the component signals 30–36. The component signals 30–36 are shown superimposed on each other in FIGURE 3a whereas the composite signal 120 derived from these signals is shown in FIGURE 3b.

The composite signal 120 exhibits a plurality of peaks 122, 124 and 126 as shown in FIGURE 3b. These peaks in a desired transient signal occur substantially in the same relation in time to each other for each random signal. Consequently, by detecting when these peaks occur a desired transient signal may be extracted from noise signals. The plural peak detector 70 detects each one of the peaks 122, 124 and 126 to produce, respectively, trigger signals 128, 130 and 132 for these peaks, as shown in FIGURE 3c.

Referring now to FIGURES 3b and 1, the initial rising slope of the composite signal 120 approaching the peak 122 causes current to flow from the junction point 68 which is amplified by the amplifier 72. The amplified output of the amplifier 72 is differentiated by the differentiator 74 and the upper terminal A of the resistor 76 becomes more positive than the lower terminal B thereof. The time constant of the differentiator 74 is selected to be sufficiently small to produce a rapidly rising current through the resistor 76. The positive signal from the terminal A of the resistor 76 is the excite signal of the difference amplier 84 whereas the less positive potential at the terminal B of this resistor is the inhibit signal of the same difference amplifier 84. Thus, the difference amplifier 84 conducts producing an A-B signal which is effectively a positive slope signal. The positive slope signal is applied to charge the storage element 90, which stores this positive slope signal. The Zener diode 92 causes the storage or integrating circuit, i.e. the capacitor 90 and the resistor 89, to limit the amplitude and hence the storage of noise spike signals applied to the storage circuit. A signal must remain for a period of time before it is fully stored in the capacitor 90. The storage capacitor 90 has a specified decay time requiring the detection of a negative slope signal by the detector 70 some small time period after the detection of a positive slope signal to produce an output signal.

The stored positive slope signal in the storage element 90 applies an enabling signal via amplifier 96 to the AND gate 98 and also applies an excite biasing signal via resistor 114 to the second difference amplifier 86. When the peak 122 of the composite signal 120 is reached, there is effectively no difference in potential levels between the terminals A and B of the resistor 76 in the differentiator 74. However, when the peak 122 starts to decrease, the capacitor 78 in this differentiator commences to discharge through the resistor 76 and amplifier 72 to ground. The current through the resistor 76 causes the terminal B thereof to become more positive than the terminal A and the second difference amplifier 86 is triggered into conduction. The conduction of the second difference amplifier 86 is rapid because of the prior biasing signal applied from the capacitor 90. The output of the second difference amplifier 86 is a negative slope signal which is applied via amplifier 100 to the AND gate 98. The presence of the negative slope signal coincident with the positive slope signal stored in the storage capacitor 90 activates the gate 98. The output of the gate 98 triggers the one-shot multivibrator 102 to produce a trigger signal T such as that shown by the trigger pulse 128 in FIGURE 3c. If the channel 4 produced this peak point, the AND gate 63 is activated by the trigger signal T to provide an output signal F which is applied to the decision circuit 104. The trigger signal 128 is also applied to the switch transistor 108 to forward bias this transistor to provide a low impedance path to ground across the capacitor 90 to discharge this capacitor and remove the positive slope signal stored therein.

The decreasing portion of the peak 122 keeps the second difference amplifier 86 producing an output but the multivibrator 102 does not fire again because of the disabling of the AND gate 98 by the discharge of the first positive slope signal from the storage element 90. When the composite signal 120 starts increasing again toward the peak 124, the first difference amplifier 84 in the plural peak detector 70 conducts and stores this positive slope on the storage element 90. The negative portion of the peak 124 causes the second difference amplifier to conduct and produce a second output trigger signal 130. Similarly, the third peak 126 also causes the production of a trigger signal 132. These trigger signals along with the signals C-I from the channels 1-7 are applied to the decision circuit 104. The decision circuit 104, by recognizing the frequency channels which caused the peaks and the relative time between the peaks, extracts the desired transient signal from the noise background. To recognize a known single class of signals as represented by the input transient signal 20, the decision circuit 104 may include a pair of one-shot multivibrators which are triggered by a signal such as F when the peak 122 is detected to produce a pair of complementary, i.e. positive and negative, signals of unequal duration which establish a search period that runs from the termination of the shorter one-shot signal to the termination of the longer one-shot signal. If a second peak such as 124 is detected within this search period and the maximum instantaneous amplitude creating the peak 124 is in a predetermined frequency channel, the coincidence of the search signal and frequency channel signal may fire a recognition gate denoting the recognition of a desired signal. Alternatively, the coincidence of these two signals may fire another pair of one-shot multivibrators to initiate a second search period to search for the peak 126 and the frequency channel causing it.

Thus, a transient analyzer embodying the invention extracts desired random signals form noise. A plural peak detector separately detects a plurality of peaks in the time domain for an input signal and the filters perform an analysis in the frequency domain to realize the detection of energy peaks in the time frequency plane to aid in the extraction of a desired transient signal from noise.

What is claimed is:
1. A transient signal analyzer for analyzing transient input signals, comprising in combination,
   separation means for separating each transient signal into a plurality of component signals of preselected frequencies,
   means for extracting the maximum instantaneous amplitudes of said component signals and combining said maximum instantaneous amplitudes into a composite maximum amplitude signal having a plurality of peaks,
   means for detecting in succession each of said peaks in said composite signal, and
   means for indicating which of said component signals produce each of said detected peaks.

2. A transient signal analyzer in accordance with claim 1 wherein said separation means comprises a plurality of bandpass filters.

3. A transient signal analyzer in accordance with claim 2 and further comprising a plurality of full-wave rectifiers each separately coupled to a bandpass filter for rectifying said component signals to produce unipolar component signals.

4. A transient signal analyzer in accordance with claim 3 and further comprising a plurality of diodes each having an anode and a cathode,
   means for separately coupling the anodes of said diodes to said full-wave rectifiers, and
   means for coupling each of said cathodes to a junction point to produce a composite signal at said junction point that exhibits instantaneous amplitudes equal to the maximum instantaneous amplitudes of said component signals.

5. A plural peak detector for detecting successive peaks in an input signal, comprising in combination,
   detecting means coupled to detect changes in amplitude in said input signal,
   first and second difference amplifiers coupled to said detecting means to produce positive and negative slope signals, respectively, in response to corresponding changes in amplitude in said input signal,
   storage means coupled to said first difference amplifier to store said positive slope signals,
   a coincidence gate coupled to produce a output signal when a negative slope signal is generated by said second difference amplifier coincident with the storage of a positive slope signal in said storage means, and
   means coupled to empty said storage means of said positive slope signal when an output signal is produced so as to prepare said storage means to store the next successive positive slope signal detected in said input signal.

6. A plural peak detector in accordance with claim 5 wherein said detecting means comprises a differentiator circuit coupled to differentiate said input signal to detect changes in the amplitude of said input signal.

7. A plural peak detector in accordance with claim 6 wherein said differentiator comprises a resistor and a capacitor.

8. A plural peak detector in accordance with claim 5 wherein said storage means comprises a capacitor.

References Cited

UNITED STATES PATENTS

| | | |
|---|---|---|
| 2,162,239 | 6/1939 | Beuermann. |
| 2,680,228 | 6/1954 | Smith. |
| 2,834,833 | 5/1958 | Lukoff. |
| 3,213,197 | 10/1965 | Hawkins. |
| 3,215,934 | 11/1965 | Sallen. |
| 3,247,457 | 4/1966 | Kaenel. |
| 3,270,188 | 8/1966 | Ares. |

RUDOLPH V. ROLINEC, *Primary Examiner.*

P. F. WILLE, *Assistant Examiner.*

U.S. Cl. X.R.

324—103; 328—151